US012228465B2

United States Patent
Tang et al.

(10) Patent No.: US 12,228,465 B2
(45) Date of Patent: Feb. 18, 2025

(54) METHOD FOR TRACEABILITY CALIBRATION OF CALIBRATION DEVICE OF ROCK CHISELING SPECIFIC POWER TESTER

(71) Applicant: NATIONAL INSTITUTE OF MEASUREMENT AND TESTING TECHNOLOGY, Chengdu (CN)

(72) Inventors: Jiangwen Tang, Chengdu (CN); Li Jiang, Chengdu (CN); Yuanhui Peng, Chengdu (CN); Liang Xue, Chengdu (CN); Jiebin Yang, Chengdu (CN); Zhuang Yang, Chengdu (CN)

(73) Assignee: NATIONAL INSTITUTE OF MEASUREMENT AND TESTING TECHNOLOGY, Chengdu (CN)

( * ) Notice: Subject to any disclaimer, the term of this patent is extended or adjusted under 35 U.S.C. 154(b) by 332 days.

(21) Appl. No.: 18/057,361

(22) Filed: Nov. 21, 2022

(65) Prior Publication Data
US 2023/0304884 A1    Sep. 28, 2023

(30) Foreign Application Priority Data

Mar. 25, 2022    (CN) .......................... 202210306419.4

(51) Int. Cl.
*G01L 25/00*    (2006.01)
(52) U.S. Cl.
CPC ................................. *G01L 25/006* (2013.01)
(58) Field of Classification Search
CPC .................................................... G01L 25/006
See application file for complete search history.

(56) References Cited

U.S. PATENT DOCUMENTS

| | | | | |
|---|---|---|---|---|
| 5,410,905 A | * | 5/1995 | Karani | .................. G01L 5/0052 |
| | | | | 73/11.01 |
| 7,900,498 B1 | * | 3/2011 | Ratcliffe | .................. G01N 3/30 |
| | | | | 73/12.09 |
| 2018/0328806 A1 | * | 11/2018 | Yamaguchi | ........... G01L 25/006 |

FOREIGN PATENT DOCUMENTS

| | | | | |
|---|---|---|---|---|
| CN | 104535258 B | * | 1/2017 | |
| CN | 105486450 B | * | 1/2018 | |
| CN | 108474708 A | * | 8/2018 | ............. G01L 25/00 |

(Continued)

*Primary Examiner* — Daniel S Larkin
(74) *Attorney, Agent, or Firm* — NORTON ROSE FULBRIGHT US LLP

(57) ABSTRACT

A method for traceability calibration of calibration device of rock chiseling specific power tester includes static calibration and dynamic calibration. Static calibration includes: placing impact indicator sensor of calibration device on static calibration stage; installing standard weight holder on adapter head of impact indicator sensor; adding a standard weight to standard weight holder several times; and calculating static coefficient k. Dynamic calibration includes: placing impact indicator sensor on dynamic calibration stage; resetting dynamic calibration coefficients a and b of calibration device; recording standard impact energy $W_0$ of dynamic standard hammer and measured indication value W of impact indicator sensor to obtain standard deviation $S = W - W_0$; and calculating dynamic coefficients a and b. Rock chiseling specific power magnitude is effectively traced to equal mass standard of standard weights. A new traceability method and system for specific power magnitude is constructed.

7 Claims, 5 Drawing Sheets

(56) References Cited

FOREIGN PATENT DOCUMENTS

| | | | | |
|---|---|---|---|---|
| CN | 209541987 U | * | 10/2019 | |
| CN | 105571775 B | * | 2/2020 | |
| CN | 110954824 A | * | 4/2020 | ........... G01L 25/003 |
| CN | 112147009 A | * | 12/2020 | ............... G01B 5/06 |
| CN | 212159419 U | * | 12/2020 | |
| JP | 2005345215 A | * | 12/2005 | |
| KR | 20080098712 A | * | 11/2008 | ............... G01M 7/08 |

* cited by examiner

METHOD FOR TRACEABILITY CALIBRATION OF CALIBRATION DEVICE OF ROCK CHISELING SPECIFIC POWER TESTER

CROSS REFERENCE TO RELATED APPLICATION

This patent application claims the benefit and priority of Chinese Patent Application No. 202210306419.4, entitled "METHOD FOR TRACEABILITY CALIBRATION OF CALIBRATION DEVICE OF ROCK CHISELING SPECIFIC POWER TESTER" filed on Mar. 25, 2022, which is incorporated by reference herein in its entirety as part of the present application.

TECHNICAL FIELD

The present disclosure relates to a rock chiseling specific power tester, and in particular, to a method for traceability calibration of a calibration device of a rock chiseling specific power tester.

BACKGROUND ART

A rock chiseling specific power tester is an instrument for detecting the rock chiseling specific power.

For example, the patent application publication No. CN111426583A discloses a rock chiseling specific power tester and a test method thereof. In this application, the rock chiseling specific power tester includes a controller and a host, and the controller controls the host to complete a test operation; the host includes an operation box and a fixed base; a rock sample fixture is arranged on the bottom of the operation box, a guide rod is vertically arranged upwards in a center of the rock sample fixture, and a drill bit is connected to the bottom of the guide rod by a drill bit mounting component; a heavy hammer sleeves the guide rod; a fixed box for fixing a direction of the guide rod is arranged at the top of the guide rod; a power lifting device for lifting the heavy hammer is further arranged in the operation box, and a hammer disengagement device is fixed adjacent to the top of the guide rod. When the power lifting device lifts the guide rod to make it contact with the hammer disengagement device, the hammer disengagement device separates the heavy hammer from the power lifting device, and the heavy hammer falls down to hit the drill bit mounting component and the drill bit, and therefore, a rock sample is chiseled. The tester can be used for measuring the chiseling specific power of a rock and a blunt width of the drill bit so as to determine the drillability grading and explodability of the rock, and realize the simple and convenient operation and the accurate measured value.

The rock chiseling specific power tester has been widely used in the field of geotechnical engineering. However, many current rock chiseling specific power testers cannot be traced. The existing reference magnitude acquisition method is to calculate the impact energy by measuring the mass and the falling height of the heavy hammer. However, due to problems such as the inability to remove the heavy hammer after installation, the inability to accurately measure the falling height, and the inability to measure a friction of the system, the tester cannot be effectively calibrated in actual use, which seriously affects the magnitude accuracy of the rock chiseling specific power tester and the reliability of its test result.

SUMMARY

The purpose of the present disclosure is to provide a method for traceability calibration of a calibration device of a rock chiseling specific power tester, so as to solve the problem that the specific power tester cannot be calibrated in the current traceability method of the rock chiseling specific power tester such that it will affect the accuracy of traceability result.

In order to solve the above technical problem, the present disclosure adopts the following technical solutions.

A method for traceability calibration of a calibration device of a rock chiseling specific power tester, includes static calibration and dynamic calibration. The static calibration includes: S1: placing an impact indicator sensor of the calibration device on a static calibration stage, resetting the calibration device to enter a static calibration mode, and resetting a static calibration coefficient k and dynamic calibration coefficients a, b; S2: installing a standard weight holder on an adapter head of the impact indicator sensor, and recording a static indication value $f_1$ of the impact indicator sensor and a total mass of weights $m_1$; S3: adding a standard weight to the standard weight holder several times, and each time the standard weight is added, recording static values $f_2, f_3, \ldots, f_n$ of the impact indicator sensor and the total mass of the weights $m_2, m_3, \ldots, m_n$; and S4: calculating a static coefficient k, and setting the calculated static coefficient as a value of the static calibration coefficient k. The dynamic calibration includes: K1: placing the impact indicator sensor of the calibration device on a dynamic calibration stage, and adjusting a dynamic standard hammer on the dynamic calibration stage to match the adapter head of the impact indicator sensor when the dynamic standard hammer falls down; K2: resetting a dynamic calibration coefficient a and a dynamic calibration coefficient b of the calibration device to enter a dynamic calibration mode, and starting the dynamic standard hammer on the dynamic calibration stage to impact the impact indicator sensor; K3: recording a standard impact energy $W_0$ of the dynamic standard hammer and a measured indication value W of the impact indicator sensor to obtain a standard deviation $S=W-W_0$; and K4: repeating measuring, for several times, the standard impact energy of the dynamic standard hammer and the measured indication value W of the impact indicator sensor to obtain the standard deviation $S_i$ (i=1, 2, 3, ..., n), splitting the standard deviation $S_i$ by a univariate linear regression method to set $S_i=a+bW$, and calculating a dynamic coefficient a and a dynamic coefficient b by the univariate linear regression method, and setting the calculated dynamic coefficients as values of the dynamic calibration coefficients a and b.

In a further embodiment, in the step S4, $f_1$ and $m_1$ are used to calculate $$k_1 = \frac{m_1 g}{f_1},$$

$f_2$ and $m_2$ are used to calculate $$k_2 = \frac{m_2 g}{f_2},$$

..., and $f_n$ and $m_n$ are used to calculate $$k_n = \frac{m_n g}{f_n},$$

and then the static coefficient k is calculated by $$k = \frac{\sum_{i=1}^{n} k_i}{n},$$

wherein g is a gravitational acceleration, and $f_i$ is a static measured indication value of the impact indicator sensor during an $i^{th}$ measurement, i=1, 2, 3, . . . , n.

In a further embodiment, during an $n^{th}$ impact, the static indication value $f_n$ of the impact indicator sensor is greater than 80% of a measuring range of the impact indicator sensor.

In a further embodiment, a calculation formula of the dynamic calibration coefficient a is $$a = \frac{\sum_{i=1}^{n} W_i \sum_{i=1}^{n}(W_i |W_i - W_{0i}|) - \sum_{i=1}^{n} W_i^2 \sum_{i=1}^{n} |W_i - W_{0i}|}{\left(\sum_{i=1}^{n} D_i\right)^2 - n \sum_{i=1}^{n} D_i^2},$$

and a calculation formula of the dynamic calibration coefficient b is $$b = \frac{\sum_{i=1}^{n} W_i \sum_{i=1}^{n} |W_i - W_{0i}| - n \sum_{i=1}^{n} W_i |W_i - W_{0i}|}{\left(\sum_{i=1}^{n} W_i\right)^2 - n \sum_{i=1}^{n} W_i^2},$$

where $W_{0i}$ is the standard impact energy of the dynamic standard hammer during the $i^{th}$ measurement, and $W_i$ is a dynamic measured indication value of the impact indicator sensor during the $i^{th}$ measurement, i=1, 2, 3, . . . , n.

In a further embodiment, a central axis is vertically arranged on the standard weight holder, and when each standard weight is added, each standard weight sleeves the central axis.

Compared with the prior art, the present disclosure has at least one of the following beneficial effects: through the method of calibrating static coefficients and dynamic coefficients, a traceability link between the rock chiseling specific power tester and its calibration device is perfected such that a new traceability system is constructed. The traceability problem that specific power magnitude of the current rock chiseling specific power tester cannot be calibrated is solved, so as to improve the magnitude accuracy of the rock chiseling specific power tester and its calibration device. Through a combination of the standard weight holder and standard weights, a production of multi-point standard magnitudes is more convenient, and the accuracy and stability of the standard magnitudes are greatly improved, thereby improving quality of magnitudes and reliability of data for the operation of the rock chiseling specific power tester. The quality of design and implementation of geotechnical engineering is further improved.

Figure 1:
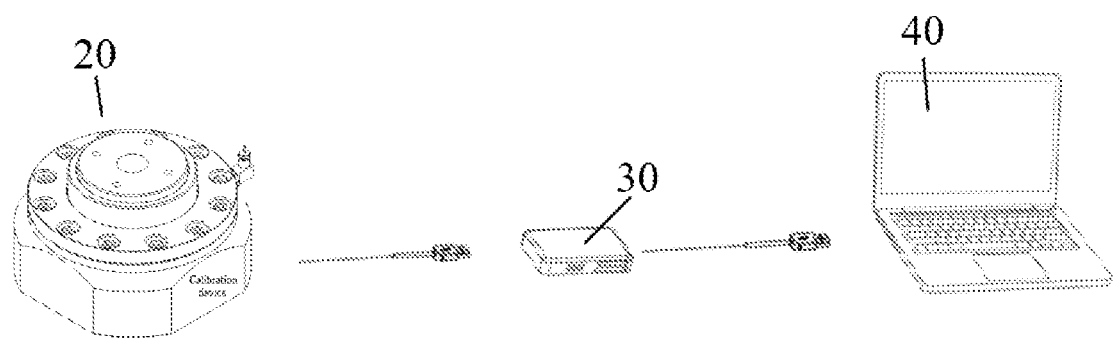
FIG. 1 is a schematic diagram of connection of a calibration device of a rock chiseling specific power tester according to the present disclosure.
Figure 2:
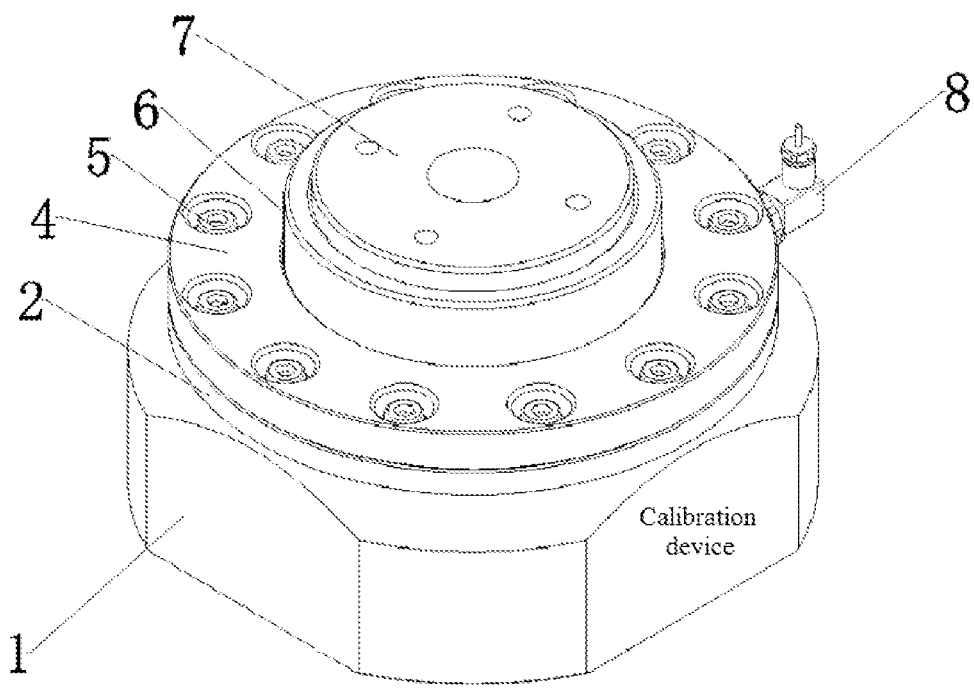
FIG. 2 is a three-dimensional schematic diagram of an impact indicator sensor of the calibration device of the rock chiseling specific power tester according to the present disclosure.
Figure 3:
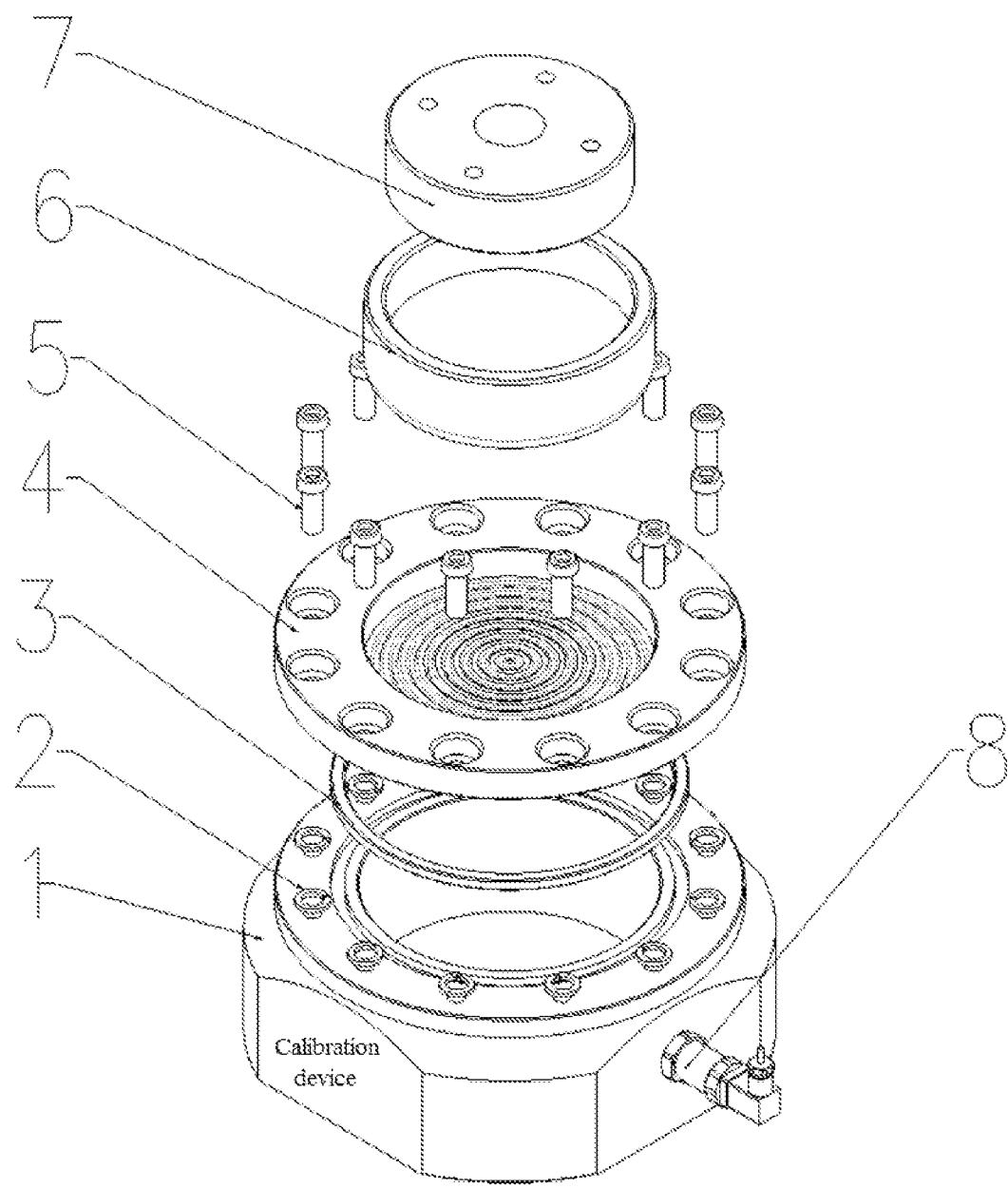
FIG. 3 is an exploded diagram of the impact indicator sensor of the calibration device of the rock chiseling specific power tester according to the present disclosure.
Figure 4:
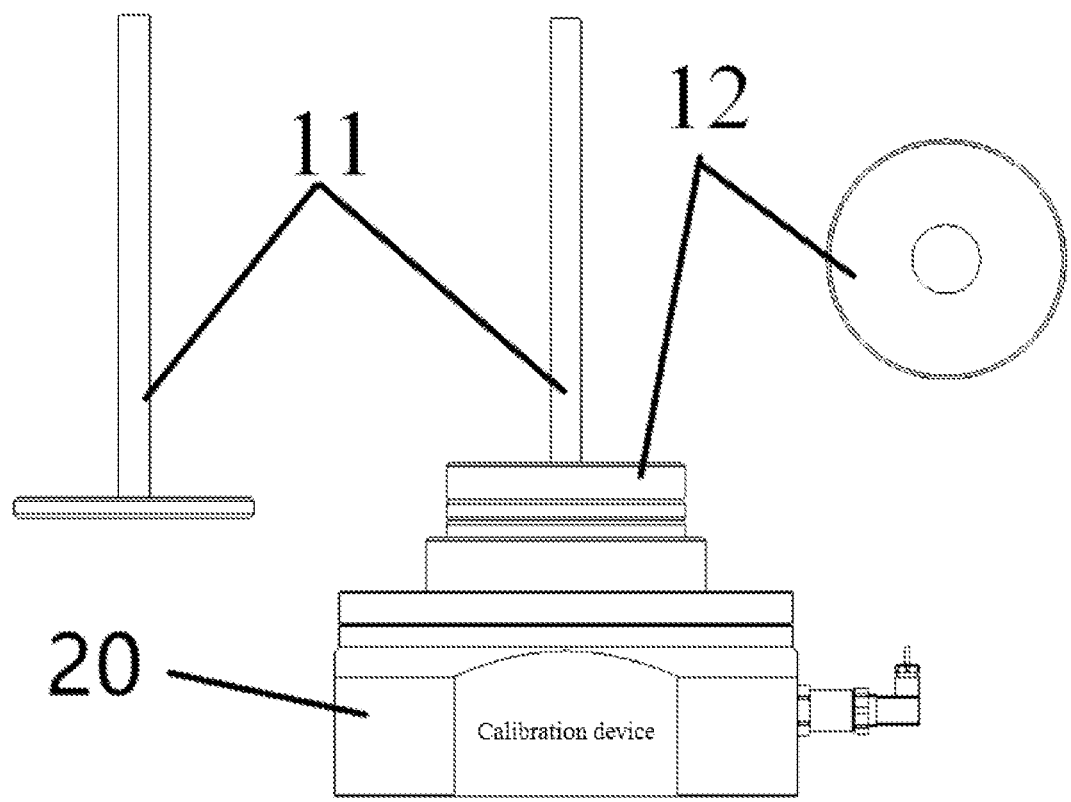
FIG. 4 is a schematic diagram of a static calibration process of the calibration device of the rock chiseling specific power tester according to the present disclosure.
Figure 5:
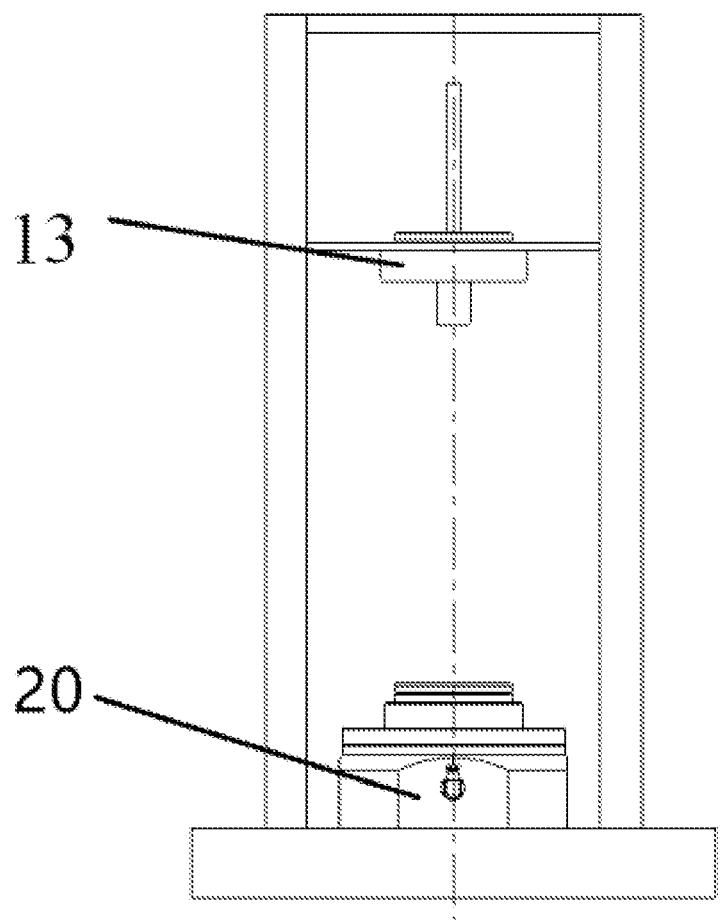
FIG. 5 is a schematic diagram of a dynamic calibration process of the calibration device of the rock chiseling specific power tester according to the present disclosure.

Icon: 20—impact indicator sensor, 30—signal adapter, 40—host computer, 1—oil tank, 2—first flange, 3—sealing ring, 4—impact sensing sheet, 5—bolt, 6—protection case, 7—adapter head, 8—sensing controller, 11—standard weight holder, 12—standard weight, 13—dynamic standard hammer.

DETAILED DESCRIPTION OF THE EMBODIMENTS

In order to make the objectives, technical solutions and advantages of the present disclosure clearer, the present disclosure will be further described in detail below with reference to the accompanying drawings and embodiments. It should be understood that the specific embodiments described herein are only used to explain the present disclosure, but not to limit the present disclosure.

Embodiment 1

A method for traceability calibration of a calibration device of a rock chiseling specific power tester includes static calibration and dynamic calibration. The static calibration includes the following steps: S1: an impact indicator sensor 20 of the calibration device is placed on a static calibration stage, the calibration device is reset to enter a static calibration mode, and a static calibration coefficient k and dynamic calibration coefficients a, b are reset; S2: a standard weight holder 11 is installed on an adapter head 7 of the impact indicator sensor 20, and an indication value $f_1$ of the impact indicator sensor 20 and a total mass of weights $m_1$ are recorded; S3: a standard weight 12 is added to the standard weight holder 11 several times, and each time the standard weight 12 is added, indication values $f_2, f_3, \ldots, f_n$ of the impact indicator sensor 20 and the total mass of the weights $m_2, m_3, \ldots, m_n$ are recorded; and S4: a static coefficient k is calculated, and the calculated static coefficient is set as a value of the static calibration coefficient k. The dynamic calibration includes the following steps: K1: the impact indicator sensor 20 of the calibration device is placed on a dynamic calibration stage, and a dynamic standard hammer 13 on the dynamic calibration stage is adjusted to match the adapter head 7 of the impact indicator sensor 20 when the dynamic standard hammer 13 falls down; K2: a dynamic calibration coefficient a and a dynamic calibration coefficient b of the calibration device are reset to enter a dynamic calibration mode, and the dynamic standard hammer 13 on the dynamic calibration stage is started to impact the impact indicator sensor 20; K3: a standard impact energy $W_0$ of the dynamic standard hammer 13 and a measured indication value W of the impact indicator sensor 20 are recorded to obtain a standard deviation $S=W-W_0$; and K4: the standard impact energy of the dynamic standard hammer 13 and the measured indication value W of the impact indicator sensor 20 are measured for several times, to obtain the standard deviation $S_i$ (i=1, 2, 3, . . . , n), the standard deviation $S_i$ is split by a univariate linear regression method to set $S_i=a+bW$, and a dynamic coefficient a and a dynamic coefficient b are calculated by the univariate linear regression method, and the calculated dynamic coefficients are set as values of the dynamic calibration coefficients a and b.

In the step S4, $f_1$ and $m_1$ are used to calculate $$k_1 = \frac{m_1 g}{f_1},$$

$f_2$ and $m_2$ are used to calculate $$k_2 = \frac{m_2 g}{f_2},$$

. . . , and $f_n$ and $m_n$ are used to calculate $$k_n = \frac{m_n g}{f_n},$$

and then the static coefficient k is calculated by $$k = \frac{\sum_{i=1}^{n} k_i}{n},$$

wherein g is a gravitational acceleration, and $f_i$ is a static measured indication value of the impact indicator sensor 20 during an $i^{th}$ measurement, i=1, 2, 3, . . . , n.

During an $n^{th}$ impact, the indication value $f_n$ of the impact indicator sensor 20 is greater than 80% of a measuring range of the impact indicator sensor 20.

A calculation formula of the dynamic calibration coefficient a is $$a = \frac{\sum_{i=1}^{n} W_i \sum_{i=1}^{n} (W_i |W_i - W_{0i}|) - \sum_{i=1}^{n} W_i^2 \sum_{i=1}^{n} |W_i - W_{0i}|}{\left(\sum_{i=1}^{n} D_i\right)^2 - n \sum_{i=1}^{n} D_i^2},$$

and a calculation formula of the dynamic calibration coefficient b is $$b = \frac{\sum_{i=1}^{n} W_i \sum_{i=1}^{n} |W_i - W_{0i}| - n \sum_{i=1}^{n} W_i |W_i - W_{0i}|}{\left(\sum_{i=1}^{n} W_i\right)^2 - n \sum_{i=1}^{n} W_i^2},$$

wherein $W_{0i}$ is the standard impact energy of the dynamic standard hammer 13 during the $i^{th}$ measurement, and $W_i$ is a dynamic measured indication value of the impact indicator sensor 20 during the $i^{th}$ measurement, i=1, 2, 3, . . . , n.

The calculated k, a, b are important coefficients for the calibration device to calculate the measurement results. The specific operation steps of the calibration device of the rock chiseling specific power tester are as follows:

The pressure data obtained by the calibration device of the rock chiseling specific power tester is calculated as an indication data. The calculation includes the following steps: A1: through an Analog-to-Digital Converter (ADC) circuit, analog-to-digital conversion is performed on a pressure analog signal detected by a pressure sensitive sensing sheet to obtain continuous magnitude data f(t) of the pressure value, where t is time of the impact force action; A2: adaptive filtering is performed on the obtained continuous magnitude data to obtain stable data $f_a(t)$, where the filtering formula is:

$$f_t = \frac{f_{t-1} \times (n-1)}{n} + \frac{f_t}{n},$$

and n is a width of a filter queue; A3: static force calibration is performed on $f_a(t)$ to obtain $f_b(t)$, i.e., $f_b(t)=k \cdot (f_a(t)-f_a(0))$, where k is the static calibration coefficient calibrated by a upper-level traceability device, and $f_a(0)$ is a measured value of $f_a(t)$ when a null point of the indication measurement is established; A4: during the time of the impact force action, an impact energy w is obtained by integrating $f_b(t)$, i.e., w=$\int f_b(t)dt$; A5: an impact indicator W is obtained by performing dynamic calibration on the impact energy w, i.e., W=a+bw, where a and b are the dynamic calibration coefficients calibrated by the upper-level traceability device; A6: the impact indicator W is transmitted as an impact indicator magnitude to a host computer 40.

A central axis is vertically arranged on the standard weight holder 11. When each standard weight 12 is added, each standard weight 12 sleeves the central axis.

Figure 6:
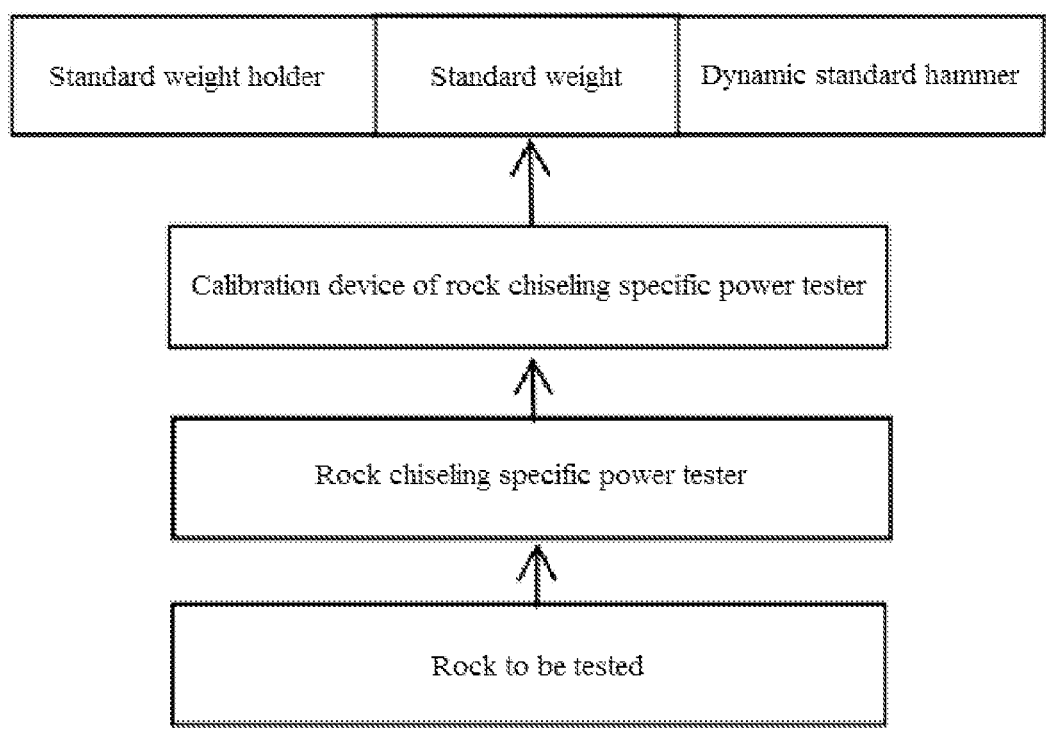
FIG. 6 is a schematic diagram illustrating a traceability relationship of the rock chiseling specific power tester according to the present disclosure.

As shown in FIG. 6, the rock chiseling specific power tester can be traced to equal mass standard of standard weights by the above method.

The present disclosure provides a traceability method based on a novel calibration device of a rock chiseling specific power tester, which constructs a traceability link from a rock to be tested to the rock chiseling specific power tester, to the calibration device of the rock chiseling specific power tester, to the standard weight holder, the standard weight and the dynamic standard hammer, and especially formulates a traceability method from the novel calibration device of the rock chiseling specific power tester to the standard weight holder, the standard weight and the dynamic standard hammer. The rock chiseling specific power magnitude can be effectively traced to equal mass standard of standard weights, and a new traceability method and system for rock chiseling specific power magnitude is constructed.

Embodiment 2

The calibration device of the rock chiseling specific power tester provided by the embodiment 1 includes an impact indicator sensor 20, a signal adapter 30 and a host computer 40. An end of the signal adapter 30 is connected to the impact indicator sensor 20 by a first USB cable, and the other end of the signal adapter 30 is connected to the host computer 40 by a second USB cable.

The impact indicator sensor 20 includes an oil tank 1, an impact sensing sheet 4 and an adapter head 7. An oil sink with an upward opening is arranged on the upper side of the oil tank 1, and hydraulic oil is in the oil sink. The impact sensing sheet 4 is hermetically connected to the upper side of the oil tank 1 for sealing the opening of the oil sink. The adapter head 7 is connected to the upper side of the impact sensing sheet 4. A mounting hole is arranged on a side of the oil tank 1, and communicates with the oil sink. A sensing controller 8 is installed in the mounting hole. The sensing controller 8 is connected to the signal adapter 30 by the first USB cable. A pressure sensitive sensing sheet and an MCU control system are arranged in the sensing controller 8. When the adapter head 7 is under pressure, such device transmits the pressure to the impact sensing sheet 4, and thus the impact sensing sheet 4 is under pressure to squeeze the hydraulic oil in the oil sink such that the pressure sensitive sensing sheet in the sensing controller 8 can sense information on hydraulic oil pressure changes. This information is transmitted to the MCU control system so that an operator can obtain the pressure data by the MCU control system.

A first flange 2 is arranged around the oil sink on the upper side of the oil tank 1. A second flange is arranged on an edge of the impact sensing sheet 4. The first flange 2 is connected to the second flange by a bolt 5, and a sealing ring 3 is arranged between the first flange 2 and the second flange. The oil tank 1 can be stably connected to the impact sensing sheet 4 by arranging the first flange 2, the second flange and the bolt 5. A gap between the first flange 2 and the second flange can be well sealed by arranging the sealing ring 3, so that the hydraulic oil in the oil tank 1 can be well sealed in the oil sink.

A wavy metal film is arranged as the middle portion of the impact sensing sheet 4. When a top surface of the metal film is impacted, the metal film is deformed towards the interior of the oil sink, so as to change the volume of the oil sink, so that internal pressure of the hydraulic oil is changed, and the pressure sensitive sensing sheet can sense these pressure changes, which will be transmitted to the MCU control system. A piston or other structure can also be arranged as the middle portion of the impact sensing sheet 4, provided that an external force can be converted into a force towards the interior of the oil sink, and further the hydraulic oil pressure can be changed.

The calibration device also includes a protection case 6. The outer wall of the protection case 6 is connected to the inner wall of the second flange, the inner wall of the protection case 6 is connected to the outer wall of the adapter head 7, and the lower side of the adapter head 7 is fitted with the upper side of the wavy metal film. The protection case 6 is used for uniforming an impact surface, and the outer wall of the protection case 6 is fitted with the inner wall of the second flange, and the inner wall of the protection case 6 is fitted with the outer wall of the adapter head 7, which can play a guiding role and ensure that when the adapter head 7 is impacted, the impact force can be correctly transmitted to the metal film of the impact sensing sheet 4 by the adapter head.

A groove for adapting a drill bit of the specific power tester is arranged on the upper side of the adapter head 7. The transmission efficiency of impulse can be ensured when the drill bit impacts, by arranging the groove for adapting a drill bit of the specific power tester. Simultaneously, the adapter head 7 has sufficient rigidity to prevent energy absorption caused by deformation.

The MCU control system converts an analog signal of the pressure sensitive sensing sheet into a digital signal and uploads the digital signal. The pressure sensitive sensing sheet is used for detecting the pressure of the hydraulic oil in the oil tank 1 in real time. The MCU control system converts the analog signal of the pressure sensitive sensing sheet into the digital signal, and calibrates thereof by the stored calibration procedure and the dynamic and static calibration coefficients, and then the calibrated data is uploaded to the host computer 40 by the signal adapter 30.

Although the present disclosure has been described herein with reference to a plurality of illustrative embodiments thereof, it should be understood that numerous other modifications and implementations can be devised by those skilled in the art that will fall within the principle scope and spirit of this disclosure. More particularly, various variations and modifications are possible in the components and/or arrangements of the subject combination arrangement within the scope of the present disclosure, drawings and claims. In addition to variations and modifications to the components and/or arrangements, other purposes will also be apparent to those skilled in the art.

What is claimed is:

1. A method for traceability calibration of a calibration device of a rock chiseling specific power tester, comprising static calibration and dynamic calibration, wherein
the static calibration comprises:
S1: placing an impact indicator sensor (20) of the calibration device on a static calibration stage, resetting the calibration device to enter a static calibration mode, and resetting a static calibration coefficient k and dynamic calibration coefficients a, b;
S2: installing a standard weight holder (11) on an adapter head (7) of the impact indicator sensor (20), and recording a static indication value $f_1$ of the impact indicator sensor (20) and a total mass of weights $m_1$;
S3: adding a standard weight (12) to the standard weight holder (11) several times, and each time the standard weight (12) is added, recording static indication values $f_2, f_3, \ldots, f_n$ of the impact indicator sensor (20) and the total mass of the weights $m_2, m_3, \ldots, m_n$; and
S4: calculating a static coefficient k, and setting the calculated static coefficient as a value of the static calibration coefficient k; and
the dynamic calibration comprises:
K1: placing the impact indicator sensor (20) of the calibration device on a dynamic calibration stage, and adjusting a dynamic standard hammer (13) on the dynamic calibration stage to match the adapter head (7) of the impact indicator sensor (20) when the dynamic standard hammer (13) falls down;
K2: resetting a dynamic calibration coefficient a and a dynamic calibration coefficient b of the calibration device to enter a dynamic calibration mode, and starting the dynamic standard hammer (13) on the dynamic calibration stage to impact the impact indicator sensor (20);

K3: recording a standard impact energy $W_0$ of the dynamic standard hammer (13) and a measured indication value W of the impact indicator sensor (20) to obtain a standard deviation $S = W - W_0$; and K4: repeating measuring, for several times, the standard impact energy of the dynamic standard hammer (13) and the measured indication value W of the impact indicator sensor (20) to obtain the standard deviation $S_i$ (i=1, 2, 3, . . . , n), splitting the standard deviation $S_i$ by a univariate linear regression method to set $S_i = a + bW$, and calculating a dynamic coefficient a and a dynamic coefficient b by the univariate linear regression method, and setting the calculated dynamic coefficients as values of the dynamic calibration coefficients a and b.

2. The method for traceability calibration of the calibration device of the rock chiseling specific power tester according to claim 1, wherein in the step S4, $f_1$ and $m_1$ are used to calculate $$k_1 = \frac{m_1 g}{f_1},$$

$f_2$ and $m_2$ are used to calculate $$k_2 = \frac{m_2 g}{f_2},$$

. . . , and $f_n$ and $m_n$ are used to calculate $$k_n = \frac{m_n g}{f_n},$$

and then the static coefficient k is calculated by $$k = \frac{\sum_{i=1}^{n} k_i}{n},$$

wherein g is a gravitational acceleration, and $f_i$ is a static measured indication value of the impact indicator sensor (20) during an $i^{th}$ measurement, i=1, 2, 3, . . . , n.

3. The method for traceability calibration of the calibration device of the rock chiseling specific power tester according to claim 2, wherein during an $n^{th}$ impact, the static indication value $f_n$ of the impact indicator sensor (20) is greater than 80% of a measuring range of the impact indicator sensor (20).

4. The method for traceability calibration of the calibration device of the rock chiseling specific power tester according to claim 1, wherein a calculation formula of the dynamic calibration coefficient a is $$a = \frac{\sum_{i=1}^{n} W_i \sum_{i=1}^{n} (W_i |W_i - W_{0i}|) - \sum_{i=1}^{n} W_i^2 \sum_{i=1}^{n} |W_i - W_{0i}|}{\left(\sum_{i=1}^{n} D_i\right)^2 - n \sum_{i=1}^{n} D_i^2},$$

and a calculation formula of the dynamic calibration coefficient b is $$b = \frac{\sum_{i=1}^{n} W_i \sum_{i=1}^{n} |W_i - W_{0i}| - n \sum_{i=1}^{n} W_i |W_i - W_{0i}|}{\left(\sum_{i=1}^{n} W_i\right)^2 - n \sum_{i=1}^{n} W_i^2},$$

wherein $W_{0i}$ is the standard impact energy of the dynamic standard hammer (13) during the $i^{th}$ measurement, and $W_i$ is a dynamic measured indication value of the impact indicator sensor (20) during the $i^{th}$ measurement, i=1, 2, 3, . . . , n.

5. The method for traceability calibration of the calibration device of the rock chiseling specific power tester according to claim 4, wherein in the step S4, $f_1$ and $m_1$ are used to calculate $$k_1 = \frac{m_1 g}{f_1},$$

$f_2$ and $m_2$ are used to calculate $$k_2 = \frac{m_2 g}{f_2},$$

. . . , and $f_n$ and $m_n$ are used to calculate $$k_n = \frac{m_n g}{f_n},$$

and then the static coefficient k is calculated by $$k = \frac{\sum_{i=1}^{n} k_i}{n},$$

wherein g is a gravitational acceleration, and $f_i$ is a static measured indication value of the impact indicator sensor (20) during an $i^{th}$ measurement, i=1, 2, 3, . . . , n.

6. The method for traceability calibration of the calibration device of the rock chiseling specific power tester according to claim 5, wherein during an $n^{th}$ impact, the static indication value $f_n$ of the impact indicator sensor (20) is greater than 80% of a measuring range of the impact indicator sensor (20).

7. The method for traceability calibration of the calibration device of the rock chiseling specific power tester according to claim 1, wherein a central axis is vertically arranged on the standard weight holder (11), and when each standard weight (12) is added, each standard weight (12) sleeves the central axis.

\* \* \* \* \*